April 7, 1959 P. J. FENYO 2,880,651
MIRROR AND ADJUSTABLE SUPPORT THEREFOR
Filed Aug. 16, 1956
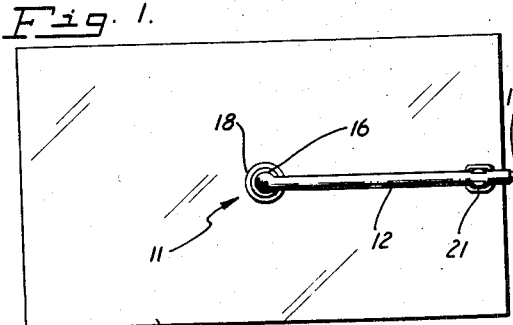
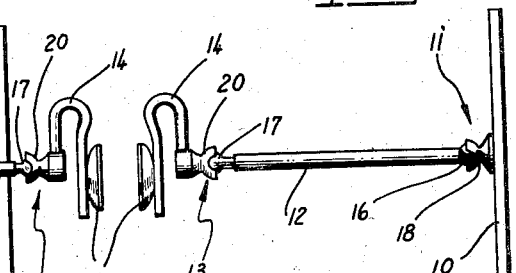
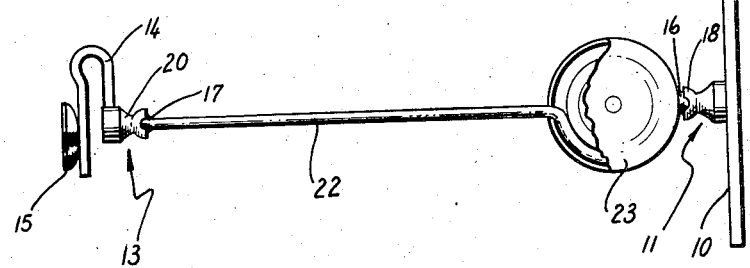
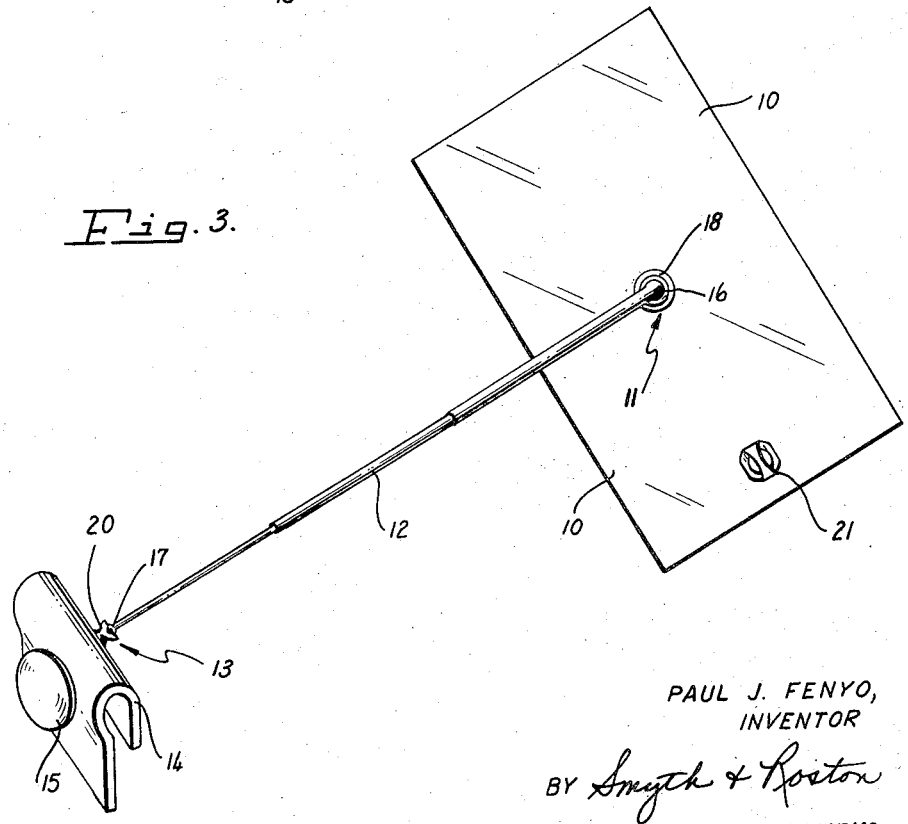
PAUL J. FENYO,
INVENTOR
BY Smyth & Roston
ATTORNEYS

United States Patent Office 2,880,651
Patented Apr. 7, 1959

2,880,651

MIRROR AND ADJUSTABLE SUPPORT THEREFOR

Paul J. Fenyo, Venice, Calif.

Application August 16, 1956, Serial No. 604,433

1 Claim. (Cl. 88—97)

The present invention relates in general to viewing mirror devices and more particularly to a viewing mirror and adjustable support therefor that permits the mirror to be positioned at any convenient distance from the end of the support and, in addition, permits the mirror to be tilted at any convenient angle.

There are many conditions under which it is desirable to support a personal mirror under circumstances where the ordinary mirror could not be properly and readily supported in usable position without the use of the hands. While traveling in an automobile, for example, a woman passenger may wish to apply lipstick or powder to her face or wish to comb her hair and yet not have convenient viewing means for doing so. Again, as is common nowadays, a man traveling in an automobile may wish to shave with his electric razor and yet find it most inconvenient to do so because he lacks suitable viewing means.

Furthermore, when a man is in an army camp, or in the field on a hunting or fishing trip, or temporarily living in a trailer, conditions are considerably different than in his own home for making his toilet. To take the situation in an army camp as illustrative, hooks or shelves within the barracks or tents where a mirror might be placed are frequently in dark places and there may be several men desiring to make their toilet for each such place. Under these conditions, it is desirable to have a mirror and supporting arrangement therefor that enables the mirror to be supported in usable position almost anywhere whereat more light and privacy is available, such as from a window pane, from a nail or from a branch of a tree.

It is, therefore, an object of the present invention to provide a mirror and adjustable supporting arrangement therefor that may conveniently be carried from place to place and readily positioned for use in each place.

It is another object of the present invention to provide a mirror and adjustable supporting arrangement therefor that permits the mirror to be positioned at any convenient distance from the end of the support and, in addition, permits the mirror to be tilted at any convenient angle.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a rear view of one embodiment of a mirror and adjustable supporting arrangement therefor according to the present invention;

Fig. 2 is a side view of the embodiment of Fig. 1;

Fig. 3 is a perspective view of the mirror and associated supporting arrangement of Figs. 1 and 2 showing the mirror and supporting arrangement in a usable position; and Fig. 4 is a side view of another embodiment of a mirror and supporting arrangement therefor, according to the present invention, shown in usable position.

Referring now to the drawings, there is shown in Figs. 1, 2 and 3 a preferred embodiment of a mirror and adjustable supporting arrangement therefor. As shown therein the preferred embodiment comprises a viewing mirror 10; a first ball-socket joint, generally designated 11, mounted on the back of mirror 10 and preferably at its center; a frictionally adjustable telescoping rod 12 joined at one end thereof to ball-socket joint 11; a second ball-socket joint, generally designated 13, joined to the other end of rod 12; and means, such as a clamping bracket 14 and a suction cup 15 also joined to ball-socket joint 13 for mounting or attaching the entire mirror mechanism to a surface, nail, tree branch or other element.

More particularly, ball-socket joints 11 and 13 comprise balls 16 and 17 and housings 18 and 20 therefore, respectively. Balls 16 and 17 are rotatably mounted within their respective housings 18 and 20, each ball, when rotated, being held in its new position by friction between the ball and its housing.

Rod 12 comprises a plurality of hollow tube sections, one inside the other. Any suitable number of such tube sections may be employed and, furthermore, the sections may be of any convenient length and diameter. Each tube section fits snugly inside the next outer tube section so that, when moved into or out from the adjacent outer section, it is firmly held in position by friction between the two sections. The appropriate end of the outer most tube section of extractable rod 12 is physically joined to ball 16 while the appropriate end of the innermost tube section is physically joined to ball 17, as shown in Figs. 1 and 2 and more clearly shown in Fig. 3.

When mirror 10 is not in use, the tube sections of rod 12 are completely inside one another and the rod is turned so as to lie parallel to the plane of the mirror. The rod is held in this position by a clip 21, as shown in Fig. 1. The mirror and supporting apparatus may then be put away in any convenient place such as the glove compartment of an automobile or, better yet, by turning clamping bracket 14 so that it lies parallel to the plane of mirror 10, the entire mechanism may be hung, by means of the clamping bracket, from the sun visor of the automobile until it is ready to be used.

When mirror 10 is to be used for one purpose or another, rod 12 is uncoupled from clip 21 and turned 90° in ball-socket joint 11 so that the rod is substantially perpendicular to the plane of the mirror, as shown in Fig. 2. In this position, the mirror mechanism is mounted, by means of suction cup 15, on a smooth surface, such as the dashboard or window of an automobile or attached, by means of clamping bracket 14, to a nail, a branch of a tree, the sun visor of an automobile, the top edge of an automobile window, or other element. Furthermore, hook 14 may serve as a base or a stand or, stated differently, as a table, and when so used the telescoping rod may be extended in a more or less upright or vertical position from the hook with the result that the mirror may be adjusted to some vertical position above some flat surface such as the floor, a table or even the earth itself.

Once the mirror mechanism is either mounted or attached as previously described, the tube sections of rod 12 are pulled out one from the other until mirror 10 is a suitable distance from either suction cup 15 or clamping bracket 14, that is, until the mirror is conveniently positioned with respect to the viewer. Following this, either mirror 10 or rod 12, or both, are rotated in their respective ball-socket joints 11 and 13 so that mirror 10 is tilted at an angle that is most convenient to the viewer, either for light or for other reasons. The mirror mechanism with the tube sections of rod 12 withdrawn one from the other and mirror 10 tilted at an angle is shown in Fig. 3.

It should be noted at this point that although clamping bracket 14 and suction cup 15 are shown in Figs. 1, 2 and 3 as being connected to the narrow tubing of telescoping rod 12, the clamping bracket and suction cup may just as well be mounted on that end of the telescoping rod having the largest diameter tubing, often preferably so.

Referring now to Fig. 4, there is shown another embodiment of a viewing mirror and adjustable support therefor. As shown in the figure, the embodiment is very similar to the preferred embodiment of Figs. 1, 2 and 3, the only differences being that in the Fig. 4 embodiment a tape 22 housed in a housing 23 is substituted for rod 12 of the preferred embodiment. Thus, as before, the embodiment comprises a mirror 10; a first ball-socket joint 11 mounted on the back side of the mirror; a second ball-socket joint 13; a suction cup 15; and a clamping bracket 14 mounted between ball-socket joint 13 and suction cup 15. Tape 22 and tape housing 23 are mounted between first and second ball-socket joints 11 and 13, respectively, the housing being physically joined on one side to ball 16 of joint 11 and the outer end of the tape being physically joined to ball 17 of joint 13.

Tape 22 may be any type of tape that is firm enough to support mirror 10 when pulled out from housing 23 and capable of rolling up upon itself when pushed back into the housing. A tape that may be adapted for use in the device of the present invention is fully described in U.S. Patent 1,947,392 entitled "Hollow Rod" by W. Guntermann et al., issued February 13, 1934.

Having thus described the invention, what is claimed as new is:

An adjustable mirror device comprising: a U-shaped clamping element attachable to a flat plate by positioning the plate between the arms of said element; a suction cup affixed to said element for mounting said element on a flat surface; a telescoping rod support means whose extensible portions are frictionally held in position upon extension thereof; a first ball-socket joint pivotally joining said rod support means to said clamping element; a reflecting mirror; a second ball and socket joint pivotally joining said mirror and rod; and a rod engaging clip mounted on the outer portion of the back side of said mirror for engaging and retaining said rod and U-shaped clamping element substantially in the plane of said mirror, thereby maintaining the device in a compact form and for storage when the said device is not in use.

References Cited in the file of this patent

UNITED STATES PATENTS

| | | |
|---|---|---|
| 365,264 | Levering | June 21, 1887 |
| 479,092 | Julian | July 19, 1892 |
| 775,003 | Eustis | Nov. 15, 1904 |
| 1,006,315 | Toth | Oct. 17, 1911 |
| 1,220,069 | Capdevila | Mar. 20, 1917 |
| 1,868,031 | Sudbrink | July 19, 1932 |